United States Patent
Kim

(10) Patent No.: US 8,957,594 B2
(45) Date of Patent: Feb. 17, 2015

(54) ILLUMINATOR WITH VARIOUS LIGHT EMISSION PATTERNS BASED ON SOUND LEVEL

(75) Inventor: Hyun Been Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 446 days.

(21) Appl. No.: 12/964,013

(22) Filed: Dec. 9, 2010

(65) Prior Publication Data

US 2011/0140635 A1 Jun. 16, 2011

(30) Foreign Application Priority Data

Dec. 11, 2009 (KR) ........................ 10-2009-0123336

(51) Int. Cl.
*H04M 1/22* (2006.01)
*H05B 37/02* (2006.01)

(52) U.S. Cl.
CPC ................................. *H05B 37/0236* (2013.01)
USPC .......................................... 315/291; 362/86

(58) Field of Classification Search
CPC ............ H05B 37/0236; H05B 37/0272; F21Y 2111/002; H04R 1/028; H04R 3/00; H04R 2201/021; H04R 29/008; H04R 5/023; H04R 7/02; H04R 9/06; H04R 9/063
USPC ............. 315/194, 209 R, 291–294, 300–308, 315/312–320
See application file for complete search history.

(56) References Cited

U.S. PATENT DOCUMENTS

| | | | | |
|---|---|---|---|---|
| 4,630,248 A * | 12/1986 | Scott | ............................ | 367/197 |
| 7,123,738 B1 * | 10/2006 | Mizone et al. | ............... | 381/406 |
| 7,152,996 B2 * | 12/2006 | Luk | ............... | 362/240 |
| 7,476,002 B2 * | 1/2009 | Wolf et al. | ..................... | 362/231 |
| 7,606,379 B2 * | 10/2009 | Ivey et al. | ..................... | 381/160 |
| 2003/0031330 A1 * | 2/2003 | Kim | ............................ | 381/111 |
| 2004/0175014 A1 * | 9/2004 | Liu | ............... | 381/386 |
| 2008/0291677 A1 * | 11/2008 | Chen | ............................ | 362/249 |
| 2009/0196016 A1 * | 8/2009 | Massara et al. | ................. | 362/86 |
| 2009/0213587 A1 * | 8/2009 | Enomoto et al. | ............. | 362/235 |

* cited by examiner

Primary Examiner — Douglas W Owens
Assistant Examiner — Amy Yang
(74) Attorney, Agent, or Firm — Ked & Associates, LLP

(57) ABSTRACT

Disclosed herein is a lighting apparatus which varies a light emission pattern of a light emitting unit based on external stimuli, such as sounds, and is aesthetically pleasing to a user through variation in light emission pattern. A lighting apparatus includes a housing having a plurality of light irradiation regions, a light emitting unit including a substrate disposed within the light irradiation regions in the housing and a plurality of light emitting diodes (LEDs) mounted on the substrate so as to correspond to the light irradiation regions, an electronic module to supply power to the light emitting unit, a sound sensing unit to sense a sound, and a controller to control at least one of ON/OFF, a light emission sequence, a light emission cycle, a quantity of light and a light emission time of the light emitting diodes based on a level of the sensed sound.

12 Claims, 14 Drawing Sheets

FIG. 6

| Sound Level | Pattern | Luminance |
|---|---|---|
| 1 | Circle | 1 |
| 2 | Animal | 2 |
| 3 | Flower | 3 | ered on Dec. 11, 2009, which is
ILLUMINATOR WITH VARIOUS LIGHT EMISSION PATTERNS BASED ON SOUND LEVEL This application claims the benefit of Korean Patent Application No. 10-2009-0123336, filed on Dec. 11, 2009, which is hereby incorporated in its entirety by reference as if fully set forth herein.

BACKGROUND OF THE INVENTION

1. Field of the Invention

The present invention relates to a lighting apparatus in which a light emission pattern of a light emitting unit is varied based on external stimuli, such as sounds.

2. Discussion of the Related Art

The lighting industry has played a key role in advance in human culture and has been closely connected to the advancement of the human race since the dawn of time.

Recently, advances in the lighting industry have progressed at a vigorous pace and numerous studies related to light sources, light emitting methods, driving methods and efficiency enhancement have been conducted.

Examples of current light sources used in lighting apparatuses include incandescent bulbs, fluorescent lamps and discharge lamps. These light sources have been used for a variety of purposes, such as domestic, industrial, and outdoor purposes.

However, light sources operating based upon electrical resistance, such as incandescent bulbs, etc., have problems of low efficiency and high heat loss, discharge lamps are expensive and exhibit poor energy efficiency, and fluorescent lamps have a problem of environment pollution due to use of mercury.

To solve disadvantages of these light sources, interest in light emitting diodes, which have a great number of advantages, such as high efficiency and realization of various colors and designs, etc., is increasing.

In particular, demand for a surface light source having more uniform optical characteristics than point/linear light sources is increasing.

SUMMARY OF THE INVENTION

Accordingly, the present invention is directed to a lighting apparatus.

An object of the present invention is to provide a lighting apparatus in which a light emission pattern of a light emitting unit is varied based on external stimuli, such as sounds.

Another object of the present invention is to provide a lighting apparatus which is aesthetically pleasing to a user through variation in light emission pattern.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve this object and other advantages and in accordance with the purpose of the invention, as embodied and broadly described herein, a lighting apparatus includes a housing having a plurality of light irradiation regions, a light emitting unit including a substrate disposed within the light irradiation regions in the housing and a plurality of light emitting diodes (LEDs) mounted on the substrate so as to correspond to the light irradiation regions, an electronic module to supply power to the light emitting unit, a sound sensing unit to sense a sound, and a controller to control at least one of ON/OFF, a light emission sequence, a light emission cycle, a quantity of light and a light emission time of the light emitting diodes based on a level of the sensed sound.

In another aspect of the present invention, a lighting apparatus includes a housing having a plurality of light irradiation regions, a light emitting unit including a substrate disposed within the light irradiation regions in the housing and a plurality of light emitting diodes (LEDs) mounted on the substrate so as to correspond to the light irradiation regions, a controller to control at least one of ON/OFF, a light emission sequence, a light emission cycle, a quantity of light and a light emission time of the light emitting diodes, a sound sensing unit to sense a sound, and an input device communicably connected to the controller to select an operating mode of the light emitting unit.

Here, the controller controls the light emitting unit based on a level of the sensed sound or the operating mode received from the input device.

In a further aspect of the present invention, a lighting apparatus includes a light emitting unit including a substrate and a plurality of light emitting diodes (LEDs) mounted on the substrate, a sound sensing unit to sense a sound, a sound level extraction unit to extract a level of the sound sensed by the sound sensing unit, a memory to store light emission patterns of the light emitting unit corresponding to extracted sound levels according to light emission patterns of the light emitting unit, which are predetermined based on the extracted sound levels, a controller to output a control signal relating to a light emission pattern of the light emitting unit stored in the memory based on the extracted sound level, and an electronic module to drive some of the light emitting diodes according to the light emission pattern of the light emitting unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 6 is a table illustrating operating states of the lighting apparatus in accordance with the present invention;

DETAILED DESCRIPTION OF THE INVENTION

In the following detailed description, reference is made to the accompanying drawings which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1A:
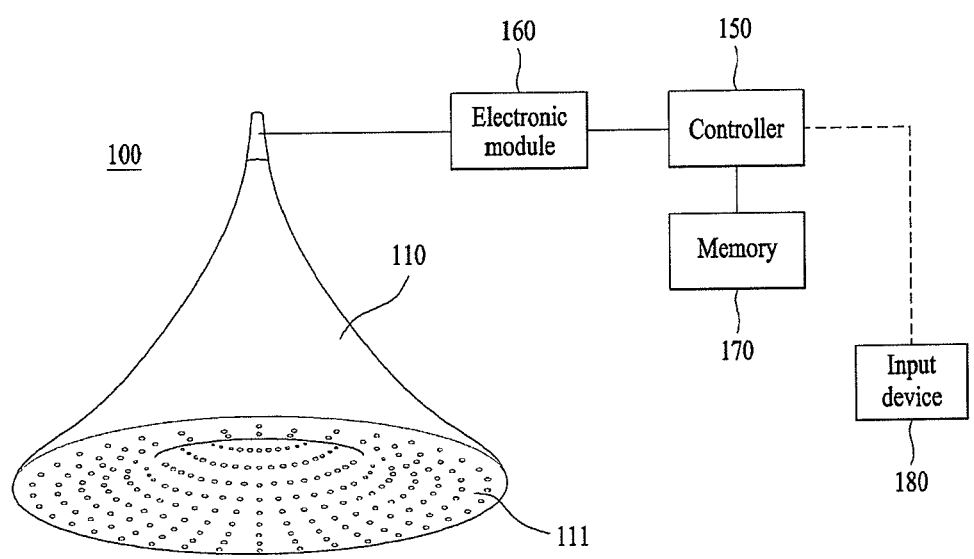
FIGS. 1A and 1B are conceptual views illustrating a lighting apparatus in accordance with one embodiment of the present invention.
Figure 1B:
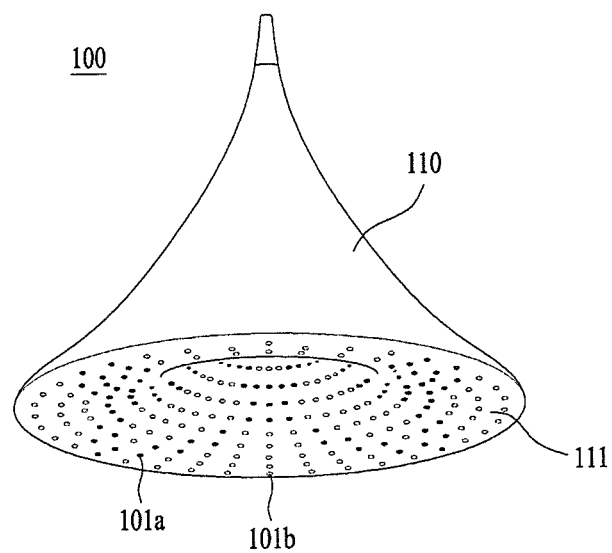
Figure 2:
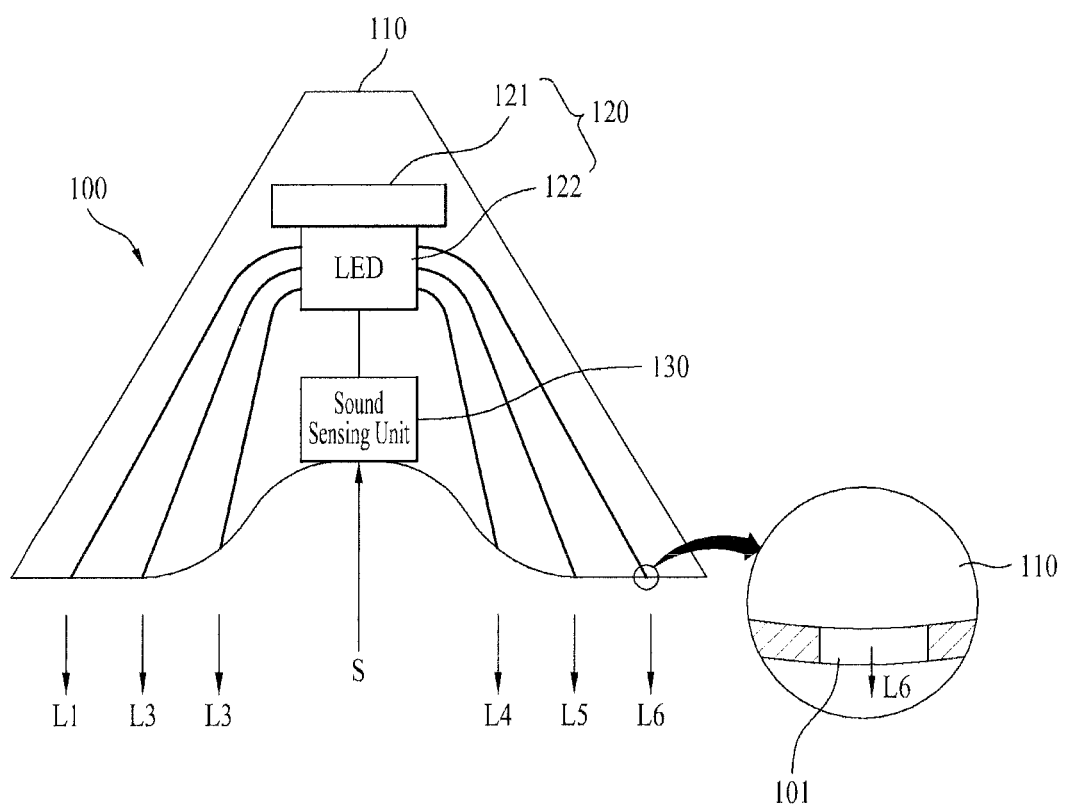
FIG. 2 is a conceptual view illustrating members constituting an essential portion of the lighting apparatus in accordance with the embodiment of the present invention.
Figure 3:
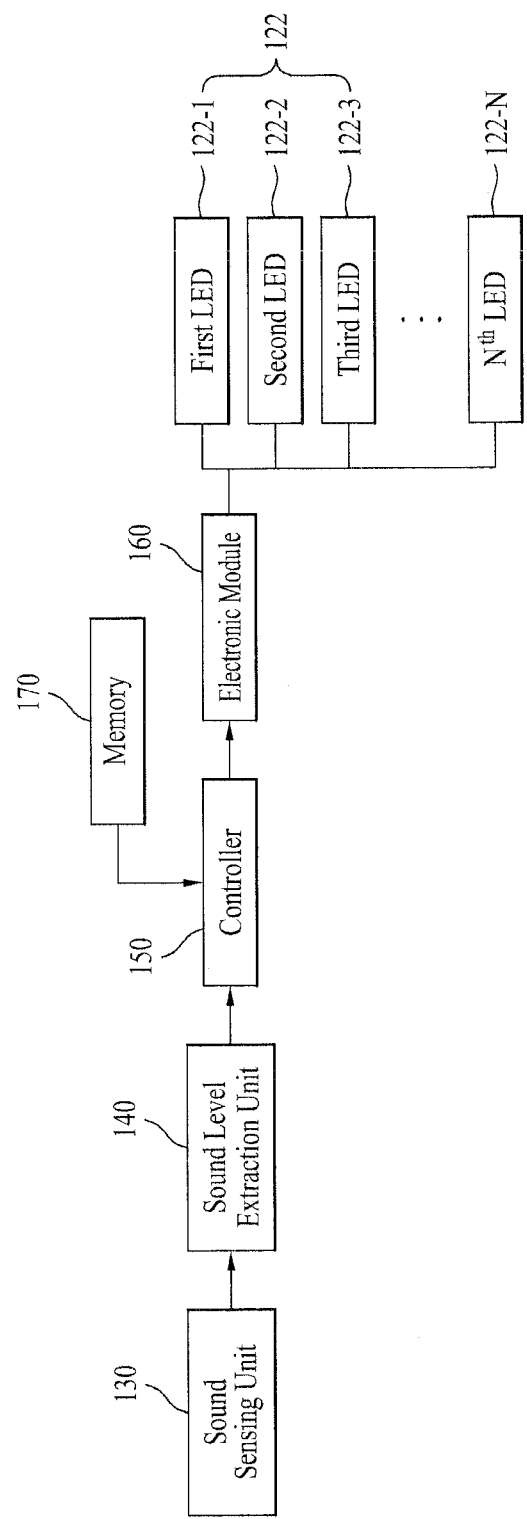
FIG. 3 is a block diagram of the lighting apparatus in accordance with the embodiment of the present invention.

FIGS. 1A and 1B are conceptual views illustrating a lighting apparatus in accordance with one embodiment of the present invention, FIG. 2 is a conceptual view illustrating members constituting an essential portion of the lighting apparatus in accordance with the embodiment of the present invention, and FIG. 3 is a block diagram of the lighting apparatus in accordance with the embodiment of the present invention.

A lighting apparatus 100 in accordance with this embodiment of the present invention includes a housing 110 having a plurality of light irradiation regions 101, a light emitting unit 120 including a substrate 121 disposed within the light irradiation regions 101 in the housing 110 and a plurality of light emitting diodes (LEDs) 122 mounted on the substrate 121 so as to correspond to the light irradiation regions 101, an electronic module 160 to supply power to the light emitting unit 120, a sound sensing unit 130 to sense a sound, and a controller 150 to control at least one of ON/OFF, a light emission sequence, a light emission cycle, a quantity of light and a light emission time of the light emitting diodes 122 based on a level of the sensed sound.

The lighting apparatus 100 in accordance with this embodiment of the present invention executes various light emission patterns based on external stimuli, such as a sound. Further, a sound level may be defined as a sound amplitude.

With reference to FIGS. 1A and 1B, the housing 110 has a horn shape, the cross-sectional area of which is increased in the longitudinal direction of the housing 110, and the light irradiation regions 101; 101a and 101b are arranged at designated intervals in the circumferential direction and the longitudinal direction on the inner circumferential surface 111 of the horn-shaped housing 110.

The housing 110 may have various shapes and structures in consideration of the external design of the housing 110. Further, the housing 110 may be made of a metal or resin, or some regions of the housing 110 may be made of a metal and the remaining regions of the housing 110 may be made of resin.

The light irradiation regions 101; 101a and 101b may be made of a material different from the material of the housing 110 so as to transmit light irradiated from the light emitting diodes 122, or be formed as through holes. Further, the light irradiation regions 101; 101a and 101b may have a circular, oval, or polygonal cross section.

The substrate 121 of the light emitting unit 120 may have a ring shape so as to surround the light irradiation regions 101; 101a and 101b in the circumferential direction of the inner circumferential surface 111 of the horn-shaped housing 110, and the light emitting diodes 122 may be mounted on the substrate 121 at designated intervals in the circumferential direction so as to correspond to the light irradiation regions 101; 101a and 101b.

The substrate 121 may be a flexible printed circuit board.

The lighting apparatus 100 in accordance with this embodiment further includes a memory 150 to store light emission patterns of the light emitting diodes 122 according to sound levels.

Here, the light emission pattern means that the light emitting unit 120 emits light according to a regular rule based on at least one of ON/OFF, the light emission sequence, the light emission cycle, the quantity of light and the light emission time of the light emitting diodes 122.

With reference to FIGS. 1A and 1B and FIG. 2, when a specific sound S is sensed by the sound sensing unit 130, the control unit 150 transmits a control signal to drive the corresponding LEDs 121-1 to 121-N corresponding to specific light emission regions 101 to the electronic module 160, and the electronic module 160 drives the light emitting unit 120 according to a corresponding light emission pattern.

For example, with reference to FIG. 2, light L1 to light L6 are irradiated through specific light irradiation regions 101 according to a corresponding sound S, and at least one of ON/OFF, the light emission sequence, the light emission cycle, the quantity of light and the light emission time of the light L1 to light L6 are changed according to the corresponding sound S.

Figure 4:
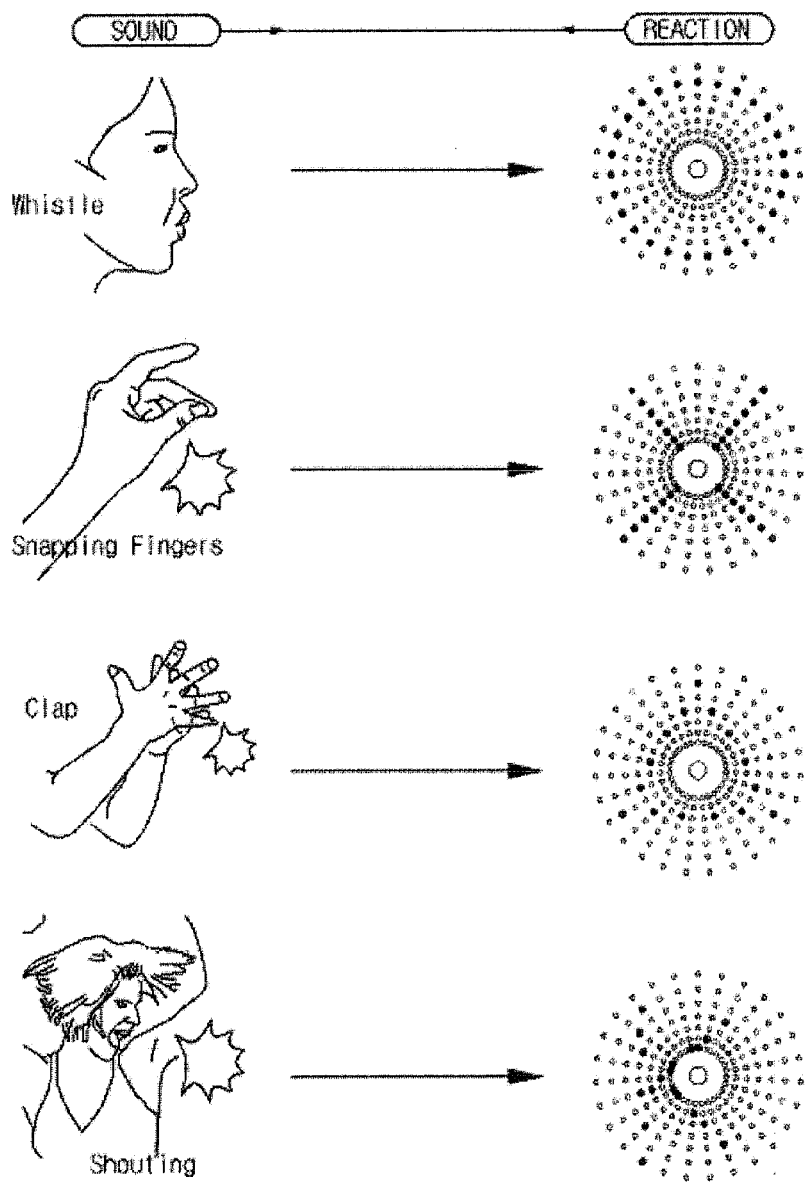
FIG. 4 is a conceptual view illustrating operating states of a lighting apparatus in accordance with the present invention.
Figure 5A:
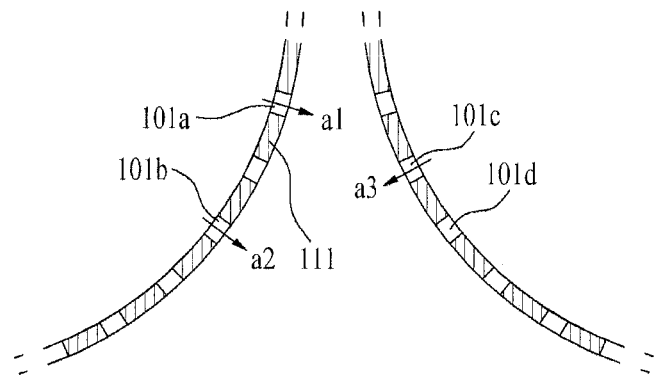
FIGS. 5A and 5B are partial cross-sectional views illustrating operating states of the lighting apparatus in accordance with the present invention.
Figure 5B:
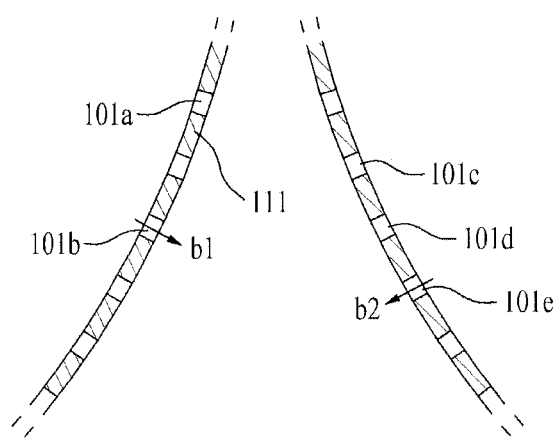

FIG. 4 is a conceptual view illustrating operating states of the lighting apparatus in accordance with the present invention, FIGS. 5A and 5B are partial cross-sectional views illustrating operating states of the lighting apparatus in accordance with the present invention, and FIG. 6 is a table illustrating operating states of the lighting apparatus in accordance with the present invention.

The lighting apparatus 100 in accordance with the present invention senses a sound, and executes a specific light emission pattern in which light irradiated through the plural light emission regions 101; 101a and 101b is adjusted.

In accordance with one embodiment, with reference to FIG. 1B, light is selectively emitted only to the light irradiation regions 101a, thereby forming a specific light emission pattern.

With reference to FIGS. 3 and 4, the lighting apparatus 100 in accordance with this embodiment may further include a sound level extraction unit 140 to extract a level of a sound sensed by the sound sensing unit 130.

When a user whistles near the lighting apparatus 100 in accordance with this embodiment, the sound sensing unit 130 of the lighting apparatus 100 senses a sound of the whistle as a sound level 1, and the lighting apparatus 100 executes a light emission pattern corresponding to the sound level 1.

Further, when the user snaps his/her fingers, the sound sensing unit 130 senses a sound of the snapping of the user's fingers as a sound level 2, and when the user claps his/her hands, the sound sensing unit 130 senses a sound of the clapping of the user's hands as a sound level 3 having a higher amplitude than the sound of the whistle and the sound of the snapping of the user's fingers.

Further, when a user shouts, the sound sensing unit 130 senses a sound of the shouting as a sound level 4.

Here, the controller 150 transmits a control signal relating to a light emission pattern corresponding to each of the sound levels 2 to 4 to the electronic module 160, and the electronic module 160 drives the light emitting unit 120 according to the corresponding light emission pattern.

Now, light emission patterns will be described in more detail.

With reference to FIG. 5A, light a1 is irradiated onto one light emission region 101a provided on the inner circumferential surface 111 of the housing 110, light a2 is irradiated onto another light emission region 101b, and light a3 is irradiated onto a further light emission region 101c, thereby forming a first light emission pattern.

With reference to FIG. 5B, light b1 is irradiated onto one light emission region 101b, and light b2 is irradiated onto another light emission region 101e, thereby forming a second light emission pattern.

With reference to FIG. 6, light emission patterns of the light emitting unit 120 are different according to sensed sound levels. For example, in the case of the sound level 1, the lighting apparatus 100 executes a light emission pattern formed in a circular shape, in the case of the sound level 2, the lighting apparatus 100 executes a light emission pattern formed in an animal shape, and in the case of the sound level 3, the lighting apparatus 100 executes a light emission pattern formed in a flower shape.

Further, in the lighting apparatus 100 in accordance with this embodiment, a luminance value of light emitted from the light emitting unit 120 may be varied according to sound levels.

For example, in the case of the sound level 1, the light emitting unit 120 has a luminance value of '1', in the case of the sound level 2, the light emitting unit 120 has a luminance value of '2', and in the case of the sound level 3, the light emitting unit 120 has a luminance value of '3'.

That is, the control unit 150 outputs a control signal, corresponding to a luminance value relating to a sound level, to the electronic module 160, and the electronic module 160 drives the light emitting unit 120 at the corresponding luminance value.

The lighting apparatus 100 in accordance with this embodiment may further include an amplifier 281 (with reference to FIG. 8) to receive and amplify an audio signal from an external audio apparatus 282 (with reference to FIG. 8), and a speaker 280 (with reference to FIG. 8) to output the audio signal amplified by the amplifier 281. Further, the lighting apparatus 100 is provided with a connection terminal connected to the external audio apparatus 282.

When the external audio apparatus 282 is connected to the lighting apparatus 100, an audible sound S2 is output through the amplifier 281 and the speaker 280. Here, the audio apparatus 282 may include a MP3 player, a TV, a radio receiver, a PMP, or a portable terminal.

Here, the sound sensing unit 130 senses the sound S2 output from the speaker 280, and the control unit 150 controls at least one of ON/OFF, the light emission sequence, the light emission cycle, the quantity of light and the light emission time of the light emitting diodes 122-1 to 122-N based on a level of the sensed sound thereby driving the light emitting unit 120 according to a corresponding light emission pattern L1 and L2.

Further, the lighting apparatus 100 in accordance with this embodiment executes a specific light emission pattern according to the level of the audible sound S2 output from the speaker 280. The lighting apparatus 100 in accordance with this embodiment may perform the function of an equalizer through the specific light emission pattern according to the level of the audible sound S2 output from the speaker 280 as well as the function of an audio apparatus.

A lighting apparatus 100 in accordance with another embodiment of the present invention includes a housing 110 having a plurality of light irradiation regions 101, a light emitting unit 120 including a substrate 121 disposed within the light irradiation regions 101 in the housing 110 and a plurality of light emitting diodes (LEDs) 122 mounted on the substrate 121 so as to correspond to the light irradiation regions 101, a controller 150 to control at least one of ON/OFF, a light emission sequence, a light emission cycle, a quantity of light and a light emission time of the light emitting diodes 122-1 to 122-N, a sound sensing unit 130 to sense a sound, and an input device 180 communicably connected to the controller 150 to select an operating mode of the light emitting unit 120.

Here, the controller 150 controls the light emitting unit 120 based on a level of the sensed sound or the operating mode received from the input unit 180.

The input unit 180 may be a local controller, and a user may control the lighting apparatus 100 through the input unit 180.

That is, the controller 150 outputs a control signal, relating to the level of the sensed sound or the operating mode received from the input unit 180, to the electronic module 160, and the electronic module 160 drives the light emitting unit 120 in the corresponding operating mode.

Further, such an operating mode may include a lighting mode to control ON/OFF of the light emitting unit 120 or a mood lighting mode in which at least one of ON/OFF, the light emission sequence, the light emission cycle, the quantity of light and the light emission time of the light emitting diodes 122-1 to 122-N is controlled according to the level of the sensed sound.

Further, the lighting mode may include a complete lighting mode to control ON/OFF of all light emitting diodes 122-1 to 122-N or a partial lighting mode to control ON/OFF of some light emitting diodes 122-1 to 122-N.

The lighting apparatus 100 in accordance with this embodiment further includes a memory 170 in which light emission patterns of the light emitting diodes 122-1 to 122-N according to sound levels are stored.

Further, as described above, the housing 110 has a horn shape, the cross-sectional area of which is increased in the longitudinal direction of the housing 110, and the light irradiation regions 101; 101a and 101b are arranged at designated intervals in the circumferential direction and the longitudinal direction on the inner circumferential surface 111 of the horn-shaped housing 110.

The housing 110 may have various shapes and structures in consideration of the external design of the housing 110. Further, the housing 110 may be made of a metal or resin, or some regions of the housing 110 may be made of a metal and the remaining regions of the housing 110 may be made of resin.

The light irradiation regions 101; 101a and 101b may be made of a material different from the material of the housing 110 so as to transmit light irradiated from the light emitting diodes 122, or be formed as through holes. Further, the light irradiation regions 101; 101a and 101b may have a circular, oval, or polygonal cross section.

The substrate 121 of the light emitting unit 120 may have a ring shape so as to surround the light irradiation regions 101; 101a and 101b in the circumferential direction of the inner circumferential surface 111 of the horn-shaped housing 110, and the light emitting diodes 122 may be mounted on the substrate 121 at designated intervals in the circumferential direction so as to correspond to the light irradiation regions 101; 101*a* and 101*b*.

The substrate 121 may be a flexible printed circuit board.

The lighting apparatus 100 in accordance with this embodiment may further include the above-described amplifier and speaker. In this case, the operating mode may include a mood lighting mode in which at least one of ON/OFF, the light emission sequence, the light emission cycle, the quantity of light and the light emission time of the light emitting diodes 122-1 to 122-N is controlled according to the level of the sound output from the speaker.

Figure 7:
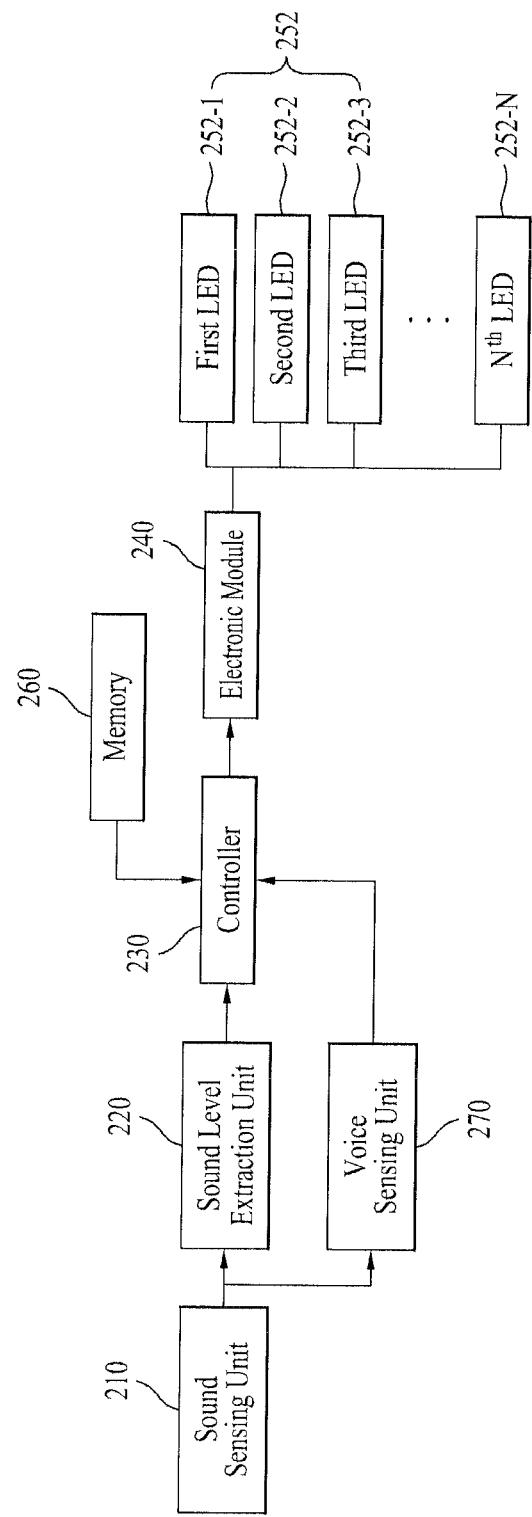
FIG. 7 is a block diagram of a lighting apparatus in accordance with another embodiment of the present invention.
Figure 8:
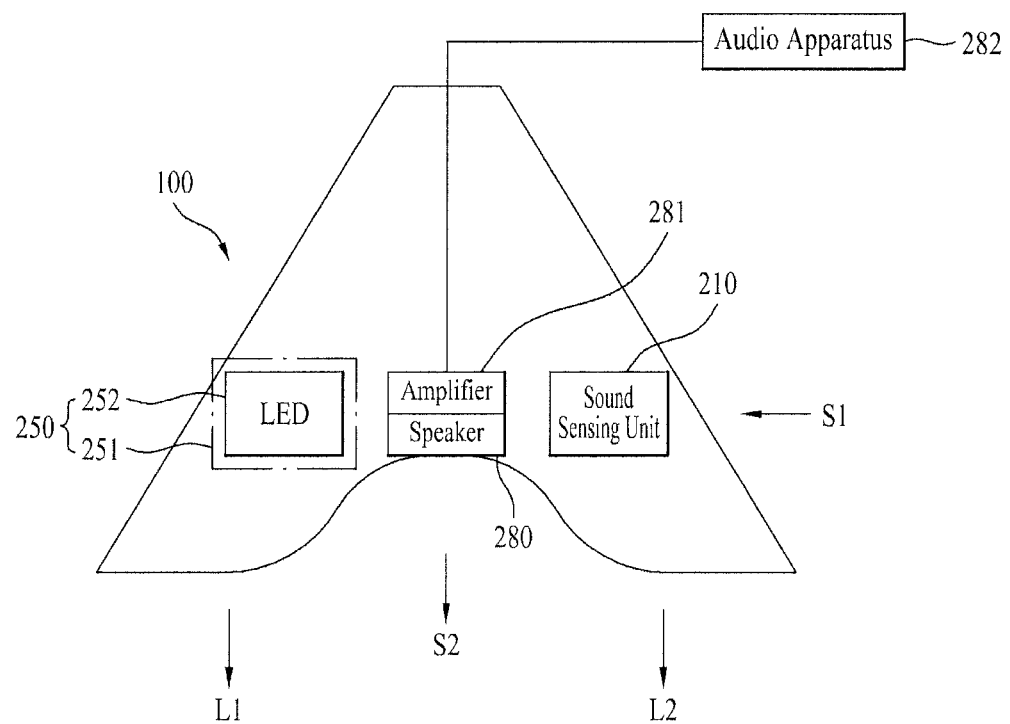
FIG. 8 is a conceptual view of the lighting apparatus in accordance with the embodiment of the present invention.
Figure 9:
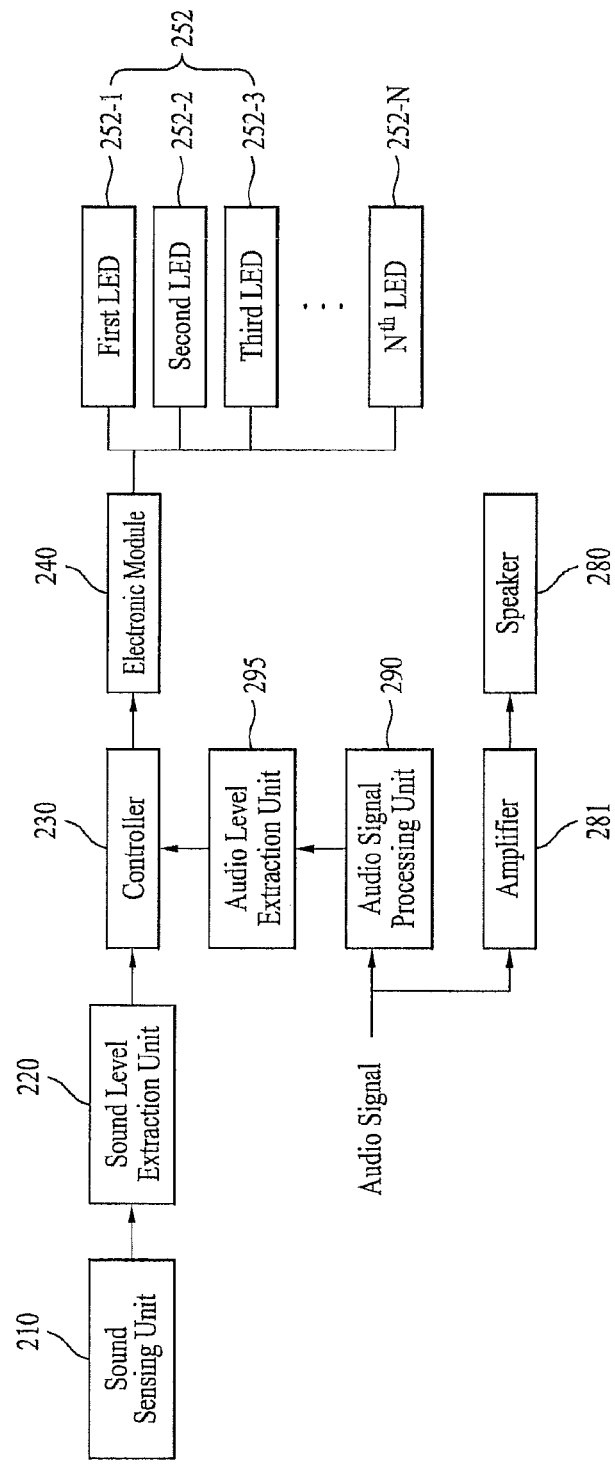
FIG. 9 is another block diagram of the lighting apparatus in accordance with the embodiment of the present invention.

FIG. 7 is a block diagram of a lighting apparatus in accordance with another embodiment of the present invention, FIG. 8 is a conceptual view of the lighting apparatus in accordance with the embodiment of the present invention, and FIG. 9 is another block diagram of the lighting apparatus in accordance with the embodiment of the present invention.

A lighting apparatus in accordance with this embodiment includes a light emitting unit 250 including a substrate 251 and a plurality of light emitting diodes (LEDs) 252; 252-1 to 252-N mounted on the substrate 251, a sound sensing unit 210 to sense a sound, a sound level extraction unit 220 to extract a level of the sound sensed by the sound sensing unit 210, a memory 260 to store light emission patterns of the light emitting unit 250 corresponding to extracted sound levels, a controller 230 to output a control signal relating to a light emission pattern of the light emitting unit 250 stored in the memory, 260 based on the extracted sound level, and an electronic module 240 to drive some of the light emitting diodes 252-1 to 252-N according to the light emission pattern of the light emitting unit 250.

The lighting apparatus in accordance with this embodiment may further include a voice sensing unit 270 to sense a voice out of the sound sensed by the sound sensing unit 210 and then to output signals corresponding to a command contained in the sensed sound.

Here, the command may be one of commands corresponding to operating modes of the light emitting unit 250 and commands to control driving of the light emitting unit 250.

In the lighting apparatus in accordance with this embodiment, when the sound sensing unit 270 senses a sound and outputs a signal corresponding to a command contained in the sensed sound to the controller 230, the controller 230 reads a pattern corresponding to the command from the memory 260 and outputs a corresponding control signal to the electronic module 240 to drive some of the light emitting diodes 252-1 to 252-N.

Here, the command is used to allow the lighting apparatus to perform a lighting function based on a desired light emission pattern, and corresponds to each of light emission patterns implemented by the lighting apparatus.

For example, the command corresponds to one light emission pattern out of first to N$^{th}$ light emission patterns or light emission patterns formed in a flower shape, an animal shape and a circular shape.

Further, the command may be one of commands instructing the lighting apparatus to turn on and off, and commands instructing the lighting apparatus to execute a mood mode, and more particularly a red mood mode, a green mood mode and a blue mood mode.

The voice sensing unit 270 includes a voice sensor, and extracts a command contained in a sensed voice by analyzing a frequency of the sensed voice.

Therefore, the lighting apparatus in accordance with this embodiment includes the voice sensing unit to sense a user command, thereby being capable of easily executing various light emission patterns and receiving drive commands.

The lighting apparatus in accordance with this embodiment may further include an audio signal processing unit 290 to process an audio signal output from an external audio apparatus, an audio level extraction unit 295 to extract a level of the audio signal processed by the audio signal processing unit 290, an amplifier 281 to receive and amplify the audio signal from the external audio apparatus, and a speaker 280 to convert the audio signal amplified by the amplifier 281 into an audible sound and then to output the audible sound.

Here, light emission patterns of the light emitting unit 250 according to audio levels extracted by the audio level extraction unit 295 are stored in advance in the memory 260, and the control unit 230 outputs a control signal relating to a light emission pattern of the light emitting unit 250 stored in the memory unit 260 based on the extracted audio level.

Therefore, the lighting apparatus in accordance with this embodiment outputs a sound of the external audio apparatus through the speaker 280, and has a light emission pattern that is based on a level of the external sound.

Figure 10:
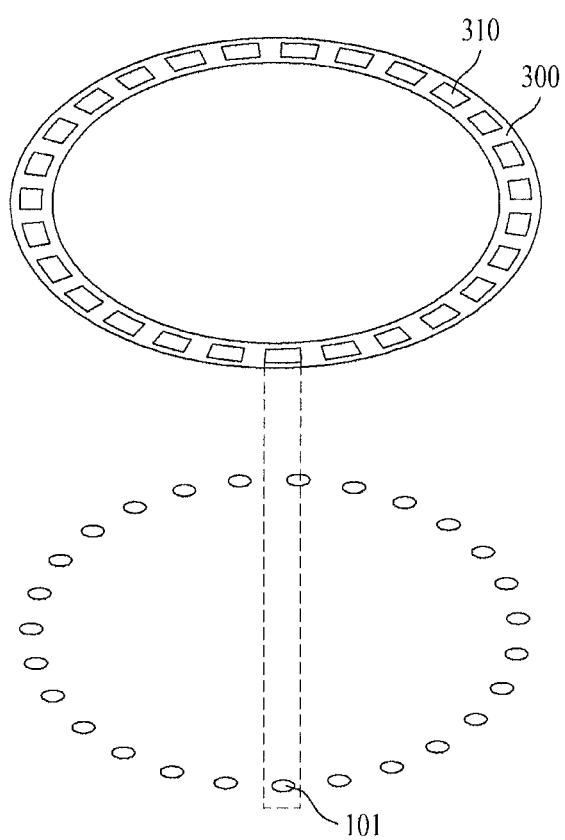
FIG. 10 is a conceptual view illustrating a light emitting unit in accordance with the present invention.

FIG. 10 is a conceptual view illustrating the light emitting unit 120 or 250 in accordance with the present invention.

As described above, the housing 110 of the light emitting unit 120 or 250 has a horn shape, the cross-sectional area of which is increased from the upper portion thereof to the lower portion thereof, and the light irradiation regions 101 are provided on the inner circumferential surface of the horn-shaped housing 110.

A light emitting unit includes a ring-shaped substrate 300 and a plurality of light emitting diodes 310 mounted on the substrate 300 so as to correspond to the light irradiation regions 101.

Figure 11:
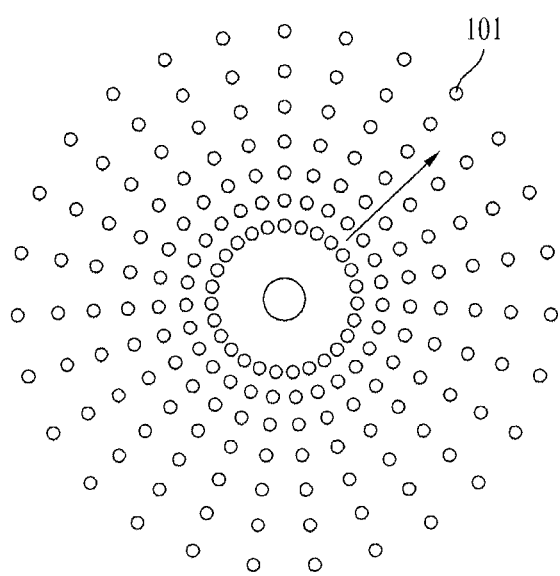
FIG. 11 is a conceptual view illustrating a light emission pattern of the light emitting unit in accordance with the present invention.
Figure 12A:
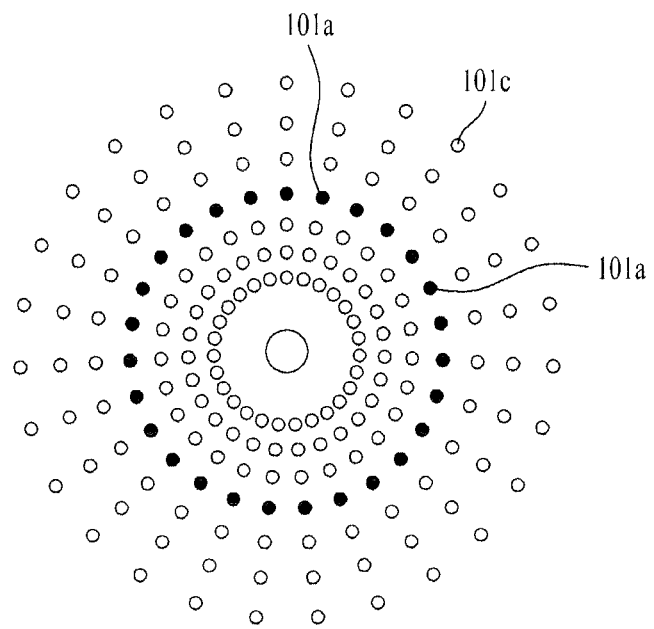
FIGS. 12A and 12B are conceptual views illustrating other light emission patterns of the light emitting unit in accordance with the present invention.
Figure 12B:
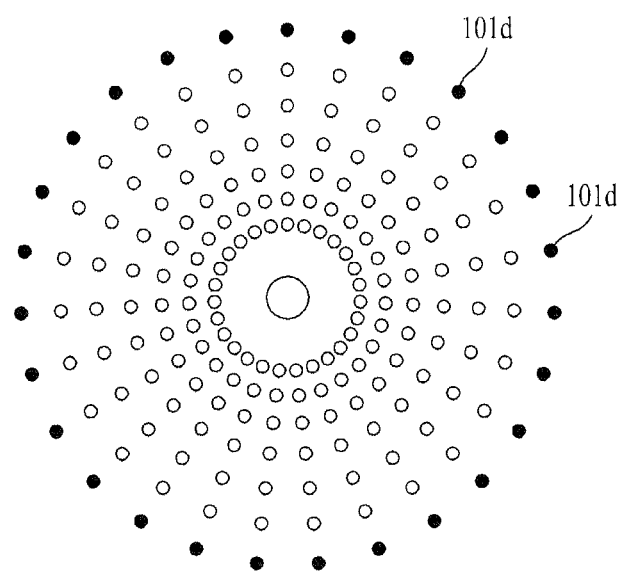
Figure 13A:
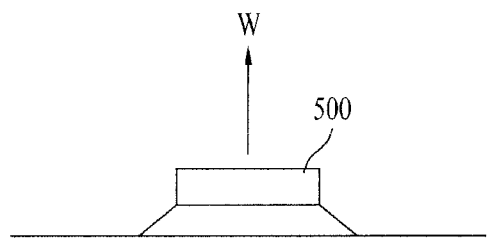
FIGS. 13A to 13C are conceptual views illustrating the light emitting unit in accordance with the present invention.
Figure 13B:
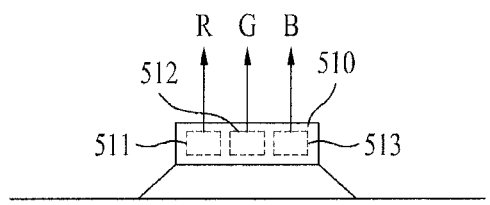
Figure 13C:
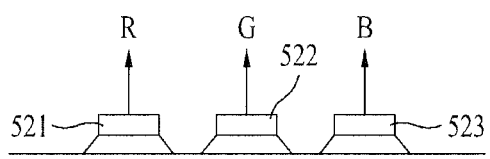

FIG. 11 is a conceptual view illustrating a light emission pattern of the light emitting unit in accordance with the present invention, FIGS. 12A and 12B are conceptual views illustrating other light emission patterns of the light emitting unit in accordance with the present invention, and FIGS. 13A to 13C are conceptual views illustrating the light emitting unit in accordance with the present invention.

With reference to FIG. 11, the lighting apparatus in accordance with the present invention may execute a light emission pattern in which light is sequentially irradiated onto the light irradiation regions 101 in the outward direction (a direction as indicated by the arrow), or execute a light emission pattern in which light is sequentially irradiated onto the light irradiation regions 101 in the opposite direction.

With reference to FIGS. 12A and 12B, a first light pattern (a pattern formed by light emission regions 101*a*) may be formed at the inner portions of the light irradiation regions 101, and a second light pattern (a pattern formed by light emission regions 101*d*) similar to the first light pattern may be formed at the outer portions of the light irradiation regions 101.

In FIG. 12A, light irradiation regions 101*c* are openings through which light is not emitted.

With reference to FIGS. 13A to 13C, the above-described light emitting diodes are white light emitting diodes 500 emitting white light W.

Alternatively, the light emitting diodes of the lighting apparatus in accordance with the present invention may include red light emitting diodes emitting red light R, green light emitting diodes emitting green light G, and blue light emitting diodes emitting blue light B.

For example, with reference to FIG. 13B, the light emitting unit includes light emitting diode packages 510 on which a red light emitting diode 511, a green light emitting diode 512 and a blue light emitting diode 513 are mounted.

Differently, with reference to FIG. 13C, the light emitting unit includes red light emitting diode packages 521, green light emitting diode packages 522, and blue light emitting diode packages 523.

As described above, a lighting apparatus in accordance with one embodiment of the present invention varies a light emission pattern of a light emitting unit based on external stimuli including sounds.

Further, the lighting apparatus in accordance with the embodiment of the present invention is aesthetically pleasing to a user through variation in light emission pattern.

Moreover, the lighting apparatus in accordance with the embodiment of the present invention varies the light emission pattern of the light emitting unit according to sound levels of an external audio apparatus.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A lighting apparatus comprising:
a housing having a plurality of holes to emit light;
a light emitting unit including a substrate provided in the housing and a plurality of light emitting diodes (LEDs) mounted on the substrate so as to correspond to the plurality of holes;
an electronic module to supply power to the light emitting unit;
a sound sensing unit to sense a sound;
a speaker; and
a controller to control at least one of ON/OFF, a light emission sequence, a light emission cycle, a quantity of light or a light emission time of the light emitting diodes based on a level of the sensed sound,
wherein the housing has a ring-shaped cross-section that gradually increases in diameter along a central vertical axis of the housing, wherein a first outer surface faces away from the central vertical axis of the housing and a second outer surface faces toward the central vertical axis, the first outer surface provided to surround the second outer surface to form a cavity between the first and second outer surfaces, wherein the speaker is provided in the cavity along the central vertical axis of the housing such that sound output is guided by the second outer surface of the housing, the second outer surface being a rigid surface that is fixed relative to the first outer surface,
wherein the plurality of holes are arranged at designated intervals in the circumferential direction and the longitudinal direction on the second surface of the housing,
wherein the substrate is a flexible printed circuit board that has a ring-shape corresponding to the ring-shape cross-section of the housing, the substrate being provided in the cavity to surround the second outer surface in the circumferential direction and the plurality of LEDs mounted on the substrate being positioned to correspond to the plurality of holes,
wherein the light emitting unit includes light emitting diode packages on which a red light emitting diode, a green light emitting diode and a blue light emitting diode are mounted,
wherein the second outer surface forms a lower surface of the housing while having a concave surface curved upward at a central part of the second outer surface,
wherein the plurality of holes are arranged at designated intervals on the lower surface and the concave surface, and
wherein the controller controls the plurality of LEDs to display one of a plurality of patterns on the second outer surface based on the level of sound sensed at the sound sensing unit.

2. The lighting apparatus according to claim 1, further comprising a memory to store light emission patterns of the light emitting diodes according to sound levels.

3. The lighting apparatus according to claim 1, further comprising:
an amplifier to receive and amplify an audio signal from an external audio apparatus, and the speaker is configured to output the audio signal amplified by the amplifier as a sound.

4. The lighting apparatus according to claim 3, wherein:
the sound sensing unit senses the sound output from the speaker; and
the controller controls the at least one of ON/OFF, the light emission sequence, the light emission cycle, the quantity of light and the light emission time of the light emitting diodes based on a level of the sensed sound output from the speaker.

5. A lighting apparatus comprising:
a housing having a plurality of holes to emit light;
a light emitting unit including a substrate provided in the housing and a plurality of light emitting diodes (LEDs) mounted on the substrate so as to correspond to the plurality of holes;
a controller to control at least one of ON/OFF, a light emission sequence, a light emission cycle, a quantity of light or a light emission time of the light emitting diodes;
a sound sensing unit to sense a sound;
a speaker; and
an input device communicably connected to the controller to select an operating mode of the light emitting unit,
wherein the controller controls the light emitting unit based on a level of the sensed sound or the operating mode received from the input device,
wherein the housing has a ring-shaped cross-section that gradually increases in diameter along a central vertical axis of the housing, wherein a first outer surface faces away from the central vertical axis of the housing and a second outer surface faces toward the central vertical axis, the first outer surface provided to surround the second outer surface to form a cavity between the first and second outer surfaces, the second outer surface being a rigid surface that is fixed relative to the first outer surface,
wherein the speaker is provided in the cavity along the central vertical axis of the housing such that sound output is guided by the second outer surface of the housing,
wherein the plurality of holes are arranged at designated intervals in the circumferential direction and the longitudinal direction on the second outer surface of the housing,
wherein the substrate is provided in the cavity and has a prescribed shape that corresponds to a shape of the cavity,
wherein the second outer surface forms a lower surface of the housing while having a concave surface curved upward at a central part of the second outer surface, wherein the plurality of holes are arranged at designated intervals on the lower surface and the concave surface, and wherein the controller controls the plurality of LEDs to display one of a plurality of patterns on the second outer surface based on the level of sound sensed at the sound sensing unit.

6. The lighting apparatus according to claim 5, wherein the operating mode includes one of a lighting mode to control ON/OFF of the light emitting unit and a mood lighting mode in which at least one of ON/OFF, the light emission sequence, the light emission cycle, the quantity of light and the light emission time of the light emitting diodes is controlled according to the level of the sensed sound.

7. The lighting apparatus according to claim 6, wherein the lighting mode includes one of a complete lighting mode to control ON/OFF of all light emitting diodes and a partial lighting mode to control ON/OFF of some light emitting diodes.

8. The lighting apparatus according to claim 5, further comprising a memory to store light emission patterns of the light emitting diodes according to sound levels.

9. The lighting apparatus according to claim 5, further comprising: an amplifier to receive and amplify an audio signal from an external audio apparatus; and the speaker to output the audio signal amplified by the amplifier as a sound.

10. The lighting apparatus according to claim 9, wherein:
the sound sensing unit senses the sound output from the speaker; and
the operating mode includes a mood lighting mode in which at least one of ON/OFF, the light emission sequence, the light emission cycle, the quantity of light and the light emission time of the light emitting diodes is controlled according to the level of the sensed sound.

11. The lighting apparatus according to claim 5, wherein the substrate is a flexible printed circuit board that has a ring-shape corresponding to the ring-shape cross-section of the housing, the substrate being provided in the cavity to surround the second outer surface in the circumferential direction and the plurality of LEDs mounted on the substrate being positioned to correspond to the plurality of holes.

12. The lighting apparatus of claim 11, wherein the light emitting unit includes light emitting diode packages on which a red light emitting diode, a green light emitting diode and a blue light emitting diode are mounted.

* * * * *